Aug. 23, 1932.  J. L. DRAKE  1,872,691
PROCESS AND APPARATUS FOR PRODUCING SHEET GLASS
Filed Jan. 18, 1928  2 Sheets-Sheet 1
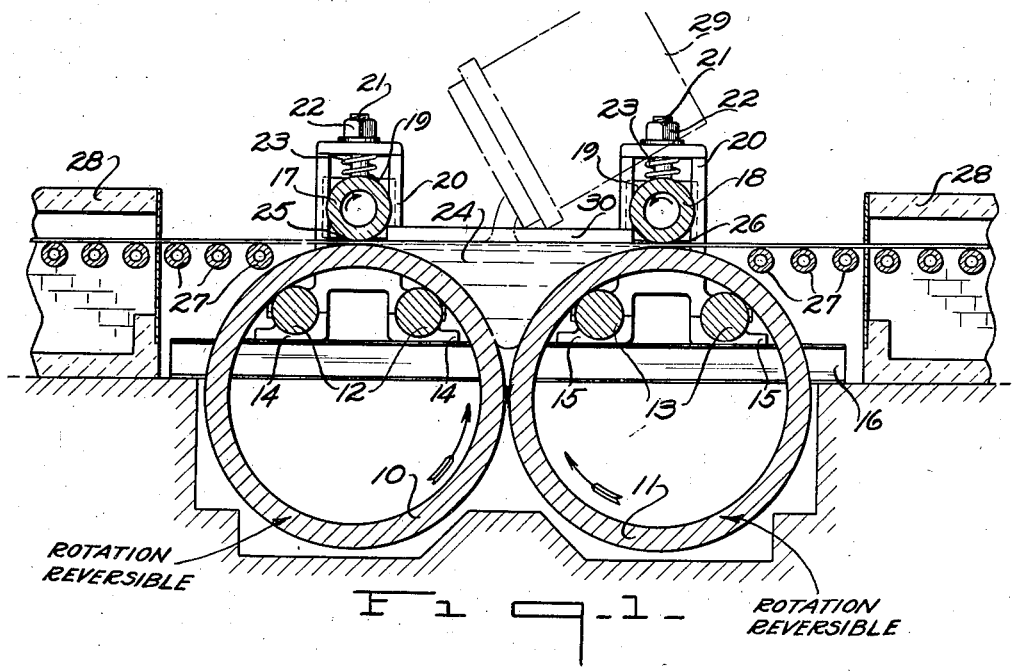
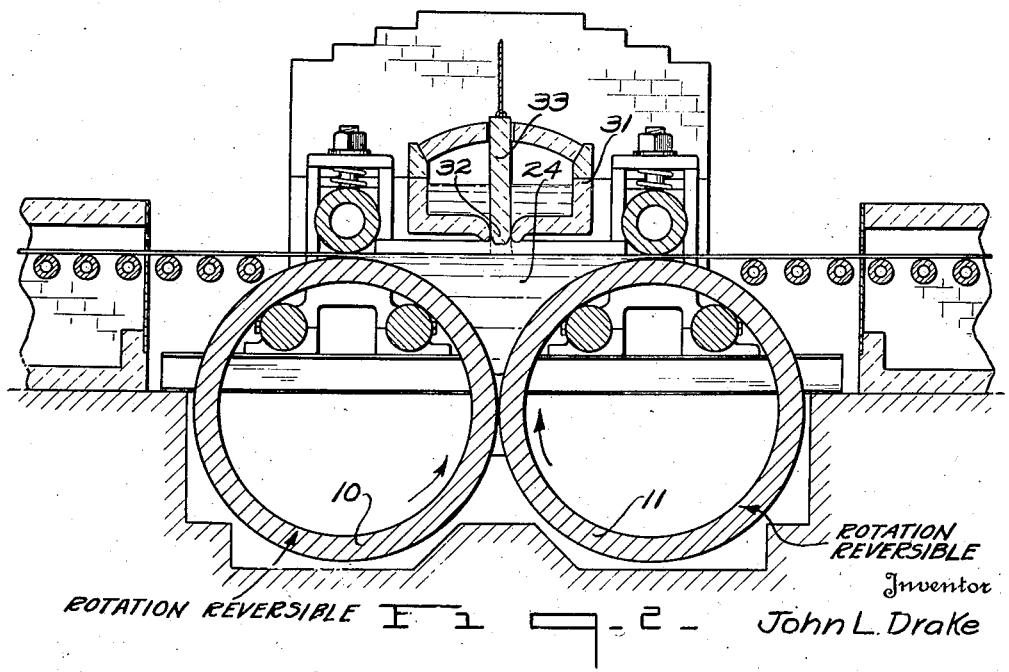
Inventor
John L. Drake
By Frank Fraser,
Attorney Aug. 23, 1932.     J. L. DRAKE     1,872,691
PROCESS AND APPARATUS FOR PRODUCING SHEET GLASS
Filed Jan. 18, 1928     2 Sheets-Sheet 2
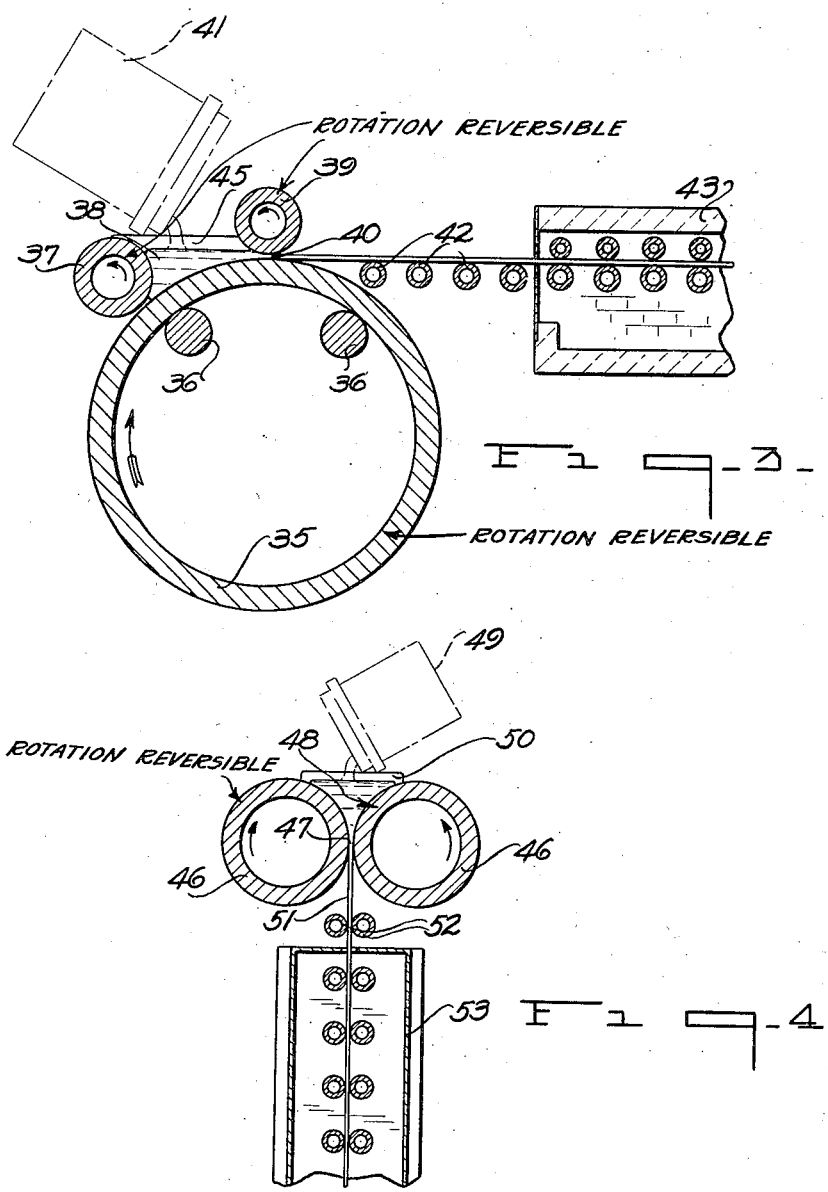
Inventor
John L. Drake
By Frank Fraser
Attorney Patented Aug. 23, 1932　　　　　　　　　　　　　　1,872,691

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR PRODUCING SHEET GLASS

Application filed January 18, 1928. Serial No. 247,474.

The present invention relates to a process and apparatus for producing sheet glass.

One of the objects of this invention is to provide means whereby a sheet of glass may be rolled from a suitable source of supply the sheet being maintained in the same plane in which it is formed, at least until the sheet has become set.

Another object of the invention is to provide sheet forming apparatus having in combination, a pair of rotary members adapted to create a sheet forming pass whereby molten glass may be applied to said pass and thereby rolled into a flat sheet of substantially predetermined thickness, together with means for supporting and conveying the sheet in such a manner that it will be maintained in the same plane in which it is formed.

Another object of the invention is to provide apparatus of this character wherein the rotary members may be reversely rotated to teem or distribute the molten glass with respect to the sheet forming pass.

Still another object of this invention is to provide in sheet forming apparatus, pairs of rotary members arranged to create two sheet forming passes whereby molten glass may be supplied to said passes and there rolled into flat sheets, the two sheets being simultaneously rolled and supplied by the same mass of molten glass.

Another object of the invention is to provide in sheet glass apparatus, two pairs of rotary members, each pair being arranged to create a sheet forming pass, the two pair of rotary members together forming a pocket wherein a mass of molten glass may be created to form a sheet source for supplying molten glass to said two sheet forming passes.

Another object of this invention is to provide a process and apparatus wherein two sheets may be rolled from a single source of supply of molten glass, each sheet being maintained in the same plane in which it is formed until after it has been annealed or at least sheet has been set.

A further object of the invention is to provide multiple sheet forming apparatus wherein pairs of rotary members are provided, the rotary members of each pair being arranged to create a sheet forming pass and the pairs of rotary members together forming a pocket adapted to receive a mass of molten glass constituting a sheet source whereby a plurality of sheets may be simultaneously rolled from a single source of supply.

Still another object of the invention is to provide such a multiple sheet forming apparatus wherein the pairs of rolls which cooperate to form a pocket for containing the mass of molten glass may be reversely rotated to teem or distribute the glass with respect to the sheet forming passes.

Other objects, advantages and novel details of construction of the present invention will be made more apparent as this description proceeds, especially when considered in connection with the accompanying drawings wherein:

Figure 1 is a vertical longitudinal sectional view through form of the apparatus.

Figure 2 is a similar view through a slightly modified form of apparatus.

Figure 3 is a similar view through still another form of apparatus, and

Figure 4 is a fragmentary vertical sectional view of another form of construction.

Referring now to the drawings and more particularly to Figure 1 thereof it will be noted that there is illustrated a multiple sheet forming apparatus comprising a plurality, here shown as two, rolls or drums 10 and 11. Each of these drums may be and preferably is of considerable size. While each drum may be supported for rotation in any suitable or desired manner each drum is herein shown as rotatably mounted on pairs of rollers 12 and 13 respectively which in turn are journalled in bearings 14 and 15, mounted upon a support 16. Either or both of the roller members 12 and 13 may be positively driven to cause a positive rotation of the roll or drum members 10 or 11. Furthermore the temperature of the rolls or drums 10 and 11 may be controlled in any desired manner by any suitable temperature control medium applied either interiorly or exteriorly thereto.

Cooperating respectively with the rolls 10 and 11 are adjustably mounted rolls 17 and 18. Each of the rolls 17 and 18 may be carried in an adjustable bearing member 19 slidable in a standard 20 and adjusted by means of a threaded shaft 21 having a cooperating nut 22. A spring 23 is preferably interposed between the bearing member 19 and the bracket or support 20 thereby permitting a separation of the rolls 17 or 18 from the respective drums 10 and 11 when necessary. Normally the rolls are urged by the springs 23, toward their respective drums, as far as the adjusting mechanism 21 will permit but in the event of a piece of clay or the like passing between the roll and drum the roll may be raised but will again assume its normal position after the foreign matter has passed therethrough.

The drums 10 and 11 cooperate to form a pocket to receive a mass of molten glass 24. This single mass of molten glass provides a source of supply for supplying molten glass to the two sheet forming passes 25 and 26 so that two entirely independent or separate sheets may be simultaneously rolled from a single source of supply of molten glass.

The rolls 17 and 18 are each preferably positively driven, but these rolls may be idled if desired, and to form the sheets of glass from the mass 24, the drums and rolls are rotated in the direction indicated by the arrows. Upon rotation of the drums and rolls in the direction indicated the molten glass 24 is advanced to the sheet forming passes 25 and 26 and is there formed into sheets S and S' which are flat and of predetermined thickness. Obviously by properly adjusting the rolls 17 and 18 the sheets S and S' may be formed of the same thickness or of different thicknesses.

In accordance with the present invention the sheets S and S' are maintained in the plane in which they are formed for a considerable length of time either until after they have been annealed or at least until the sheets have become set. By maintaining the sheets in the same plane in which they are formed there is no tendency for buckling, warping or other similar defects in the sheet. If, however, the sheet is allowed to bend or be moved in an arcuate path there is a tendency for the formation of waves or other similar defects. In accordance with the present invention the sheets S and S' after being formed are moved in a straight line from their points of formation and supported in the substantially horizontal plane in which they leave the sheet forming mechanism by means of horizontally arranged supporting and conveying rolls 27. To further insure that the sheets are maintained in the same plane or a straight line the supporting rolls 27 may be so driven (by driving mechanism not shown) that the sheets are placed under a slight tension which will obviously prevent sagging of the sheet between the supporting rolls. However, it should be understood, that the speed at which the rolls 27 are rotated is preferably such that there will be no tendency for the sheets to be appreciably reduced in thickness.

The reference character 28 indicates annealing lehrs through which the sheets are passed after they have been formed.

The molten glass 24, in the embodiment of the invention illustrated in Figure 1, is deposited into the pocket formed by the drums 10 and 11 from a pot 29 indicated by dot and dash lines and therefor the glass is known as "pot glass". In the production of pot glass, the batch is melted and completely refined in the same receptacle, the glass being refined while it is maintained in a quiescent state so that the quality of the glass will be exceptionally good. The quality of the glass is good because glass produced in a pot is given sufficient time to permit the proper refining thus allowing the removal of bubbles, etc. which if allowed to remain, form seeds and blisters in the finished product. In operating the construction shown in Figure 1 a pot of glass is emptied into the pocket formed by drums 10 and 11 to form a source 24 from which the sheets S and S' are produced. After a pot full of glass has been poured and rolled into sheets, the pocket created by the drums 10 and 11 may be cleaned or another pot full may be emptied into the pocket before the mass from the preceding pot has been entirely used, thus creating a continuous operation.

While any suitable means may be provided for rotating the roller members 12 and 13 to thus drive the drums 10 and 11 it is desirable that this driving mechanism for the drums 10 and 11 be such that these drums may be reversely rotated or in other words rotated in directions opposite to those indicated by the arrows. By reversely rotating these drum members the mass of molten glass 24 is teemed or distributed throughout the pocket and thus presented to both the sheet forming passes 25 and 26 throughout the length thereof. That is, the glass is initially deposited within the pocket intermediate the ends of the rolls or drums so that when the drums are reversely rotated, such rotation will cause the molten glass to be spread laterally or longitudinally within the pocket to the end that when the rolls are again rotated in the directions indicated by the arrows, the molten glass will be supplied to both sheet forming passes throughout the length thereof. In order to restrain the molten glass at the ends of the pocket substantially triangular plates or guns 30 are provided.

The modified form of construction illustrated in Figure 2 is identical with that illustrated in Figure 1 in every particular with one exception. Therefore, those parts which are similar to those heretofore described in detail will not again be specifically referred to. Corresponding reference characters indicate corresponding parts in the two figures. The present construction illustrated in Figure 2 differs from the previously described construction in that in the present instance the source molten glass 24 which is supplied to the pocket formed by the drums 10 and 11 is created by means of a preferably continuous tank furnace 31. In this construction the molten glass is allowed to discharge through an opening 32 controlled by a valve or the like 33.

In Figure 3 another form of construction is illustrated which includes a drum 35 rotatably mounted on rollers 36 either or both of which may be positively driven by means (not shown) to cause a positive rotation of drum 35. As in the previously described forms of construction the temperature of the drum 35 may be controlled by any suitable temperature control medium applied either interiorly or exteriorly thereto.

Associated with the drum 35 is a roll 37 which cooperates therewith to form a pocket which is adapted to receive a mass of molten glass 38. A roll 39 cooperates with the drum 35 to create a sheet forming pass 40. The roll 39 may be adjustably mounted with respect to the drum 35 as for instance by means such as described in connection with the first two forms of this invention.

The roll 39 is preferably positively driven but it may be idled if desired, and to form a sheet of glass from the mass 38 the drum and rolls are rotated in the direction indicated by the arrows. Molten glass which has previously been completely melted and refined in a receptacle such as pot 41 is poured into the pocket formed between drum 35 and roll 37 to create the molten mass 38. As in the previously described forms of construction the sheet after being formed is moved in a straight line from its points of formation and for this purpose supporting and conveying rolls 42 are provided arranged in a horizontal plane. The reference character 43 designates an annealing lehr through which the sheet is passed after it has been formed. As previously mentioned the rolls 42 may be so driven that the sheet is placed under a slight tension which will obviously prevent sagging of the sheet between the supporting rolls. Additional upper rolls 44 may be provided in this form of construction and in both of the previously described forms of construction if found necessary or desirable in order to prevent slippage of the sheet when the rolls are driven to put the same under tension.

By reversely rotating the drum 35 and rolls 37 and 39 the mass of molten glass 38 may be readily teemed or distributed so as to spread the same uniformly throughout the pocket and in position to be advanced to the sheet forming pass 40. The ends of the pocket are defined by guns or plates 45.

In Figure 4 sheet forming means are illustrated wherein the sheet is drawn downwardly. In this form of construction there is illustrated a pair of forming rolls 46 which cooperate to create a sheet forming pass 47 and a pocket adapted to receive a mass of molten glass 48 supplied thereto in any desired manner as for instance by means of a pot 49. Guns or triangular plates 50 define the ends of the pocket containing the molten mass 48. The temperature of the forming rolls 46 may be controlled by any suitable temperature control medium applied either interiorly or exteriorly.

The sheet 51 is engaged by sheet feeding rolls 52 and drawn downwardly where it is passed into a lehr 53. During the sheet forming operation the forming rolls 46 rotate in the direction of the arrows but in order that the mass of molten glass 48 may be thoroughly teemed and distributed throughout the sheet forming pass prior to being reduced to sheet form, the rolls are initially rotated in the direction opposite to the direction indicated by the arrows.

While several embodiments of the invention have been illustrated and described herein somewhat in detail it will be readily apparent to those skilled in this art that various changes, modifications and rearrangements may be resorted to without departing from the spirit and scope of this invention and to this end reservation is made to make such changes as may come within the purview of the accompanying claims.

I claim:

1. In the process of producing sheet glass, those steps which consist in creating a mass of molten glass, passing the glass between moving surfaces to produce a sheet of glass and initially teeming the mass by moving said surfaces in a reverse direction.

2. In the process of producing sheet glass, those steps which consist in creating a mass of molten glass, passing the glass between moving surfaces to produce a sheet of glass, moving said sheet in a straight line from its point of formation until it has become set and initially teeming the mass by moving said surfaces in a reverse direction.

3. In the process of producing sheet glass, those steps which consist in creating a mass of molten glass on a moving surface, passing the glass between its supporting surface and another moving surface to produce a sheet and initially teeming the glass by reversely moving the supporting surface.

4. In the process of producing sheet glass, those steps which consist in creating a mass of molten glass on a moving surface, passing the glass between its supporting surface and another moving surface to produce a sheet, moving the sheet in a straight line from the point of formation until it has become set, and initially teeming the glass by reversely moving the supporting surface.

5. In the process of producing sheet glass, those steps which consist in creating a mass of molten glass, simultaneously passing the glass in opposite directions on moving surfaces to produce sheets of glass and initially teeming the glass by reversely moving said surfaces.

6. In the process of producing sheet glass, those steps which consist in creating a mass of molten glass in a pocket formed by juxtapositioned rotatable members, simultaneously forming two sheets from said molten mass and initially teeming the mass by reversely rotating said rotatable members.

7. In the process of producing sheet glass, those steps which consist in creating a mass of molten glass in a pocket formed by juxtapositioned rotatable members, forming a sheet from said mass in a horizontal plane, moving said sheet in a straight horizontal plane until it has become set and initially teeming the mass by reversely rotating said rotatable members.

8. In the process of producing sheet glass, those steps which consist in creating a mass of molten glass in a pocket formed by juxtapositioned rotatable members, simultaneously forming two sheets therefrom and initially teeming the mass by reversely rotating said rotatable members.

9. In the process of producing sheet glass, those steps which consist in creating a mass of molten glass in a pocket formed by juxtapositioned rotatable members, simultaneously forming two sheets therefrom, moving said sheets in a straight line from their points for formation until said sheets have become set and initially teeming the mass by reversely rotating said rotatable members.

10. In the process of producing sheet glass, those steps which consist in creating a mass of molten glass in a pocket formed by a pair of juxtapostioned rotatable drums, passing the glass in opposite directions between said drums and cooperating moving surfaces to produce sheets and initially teeming the glass by reversely rotating said drums.

11. In the process of producing sheet glass, those steps which consist in creating a mass of molten glass in a pocket formed by juxtapostioned rotatable drums, passing the glass in opposite directions between said drums and other moving surfaces to produce sheets, moving each sheet in a straight line from its point of formation until it has become substantially set and initially teeming the mass by reversely rotating said rotatable drums.

12. In sheet glass apparatus, a pair of rotatable drums cooperating to form a pocket for receiving a mass of molten glass, means cooperating with said drums for rolling said mass into sheet form and means for initially reversely rotating said drums to teem said mass.

13. Sheet glass apparatus of the character described comprising in combination, a pair of rotatable drums juxtapositioned to form a pocket, means for creating a mass of molten glass in said pocket, a roll associated with each drum and arranged to create a sheet forming pass whereby the molten glass from said pocket may be moved through said passes to simultaneously form a plurality of sheets and means for reversely rotating said drums to initially teem the mass of molten glass in said pocket.

14. In sheet glass apparatus, a pair of rotatable drums associated with one another to form a pocket therebetween within which is adapted to be received a mass of molten glass, a roll associated with each drum and cooperating therewith to create a sheet forming pass, means for rotating said drums whereby the molten glass will be moved from the pocket through said passes to simultaneously form a plurality of sheets, and horizontally disposed means for receiving the sheets and carrying them forwardly in straight horizontal lines from their points of formation until they have become substantially set.

Signed at Toledo, in the county of Lucas and State of Ohio, this 13th day of January, 1928.

JOHN L. DRAKE.